(12) United States Patent
Canada et al.

(10) Patent No.: US 11,861,018 B2
(45) Date of Patent: *Jan. 2, 2024

(54) METHOD AND SYSTEM FOR DYNAMIC TESTING WITH DIAGNOSTIC ASSESSMENT OF SOFTWARE SECURITY VULNERABILITY

(71) Applicant: Ventech Solutions, Inc., Columbus, OH (US)

(72) Inventors: Matthew Canada, Rosedale, MD (US); Jerry Allen Craig, II, Knoxville, TN (US); Kathrine Dass, Severna Park, MD (US); Raja Krishnamurthy, Lewis Center, OH (US); Dipanjan Nag, Columbus, OH (US); Eugene Noble, Bethesda, MD (US); David Anthony Rigsby, Heath, OH (US); Richard Nathan Toney, Windsor Mill, MD (US); Stephen J. Veneruso, Columbus, OH (US)

(73) Assignee: Ventech Solutions, Inc., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,473

(22) Filed: Aug. 30, 2022

(65) Prior Publication Data

US 2023/0068721 A1 Mar. 2, 2023

Related U.S. Application Data

(63) Continuation of application No. 16/525,207, filed on Jul. 29, 2019, now Pat. No. 11,544,385.

(51) Int. Cl.
*G06F 21/57* (2013.01)
*G06F 21/52* (2013.01)
(Continued)

(52) U.S. Cl.
CPC ............ *G06F 21/577* (2013.01); *G06F 21/52* (2013.01); *G06F 21/552* (2013.01); *G06Q 40/08* (2013.01); *G06F 2221/033* (2013.01)

(58) Field of Classification Search
None
See application file for complete search history.

(56) References Cited

U.S. PATENT DOCUMENTS 7,284,274 B1 * 10/2007 Walls .................. G06F 8/70
726/25
7,552,480 B1 * 6/2009 Voss .................. G06F 21/577
713/150

(Continued)

*Primary Examiner* — Michael Pyzocha
(74) *Attorney, Agent, or Firm* — MAHAMEDI IP LAW LLP

(57) ABSTRACT

A method and system of applying a security vulnerability assessment of a software program. The method comprises directing, from a security assessing server, to a software program under execution, a plurality of attack vectors, diagnosing a set of results associated with the software program under execution as comprising a security vulnerability, the set of results produced based at least in part on the plurality of attack vectors, and assessing a monetary premium of a risk insurance policy merited by an enterprise based at least in part on a level of control ceded to an attacker in accordance with the set of results.

20 Claims, 3 Drawing Sheets

(51) Int. Cl.
*G06F 21/55* (2013.01)
*G06Q 40/08* (2012.01)

(56) References Cited

U.S. PATENT DOCUMENTS

| | | | |
|---|---|---|---|
| 7,950,057 B1 | 5/2011 | Kennedy | |
| 8,806,647 B1 | 8/2014 | Daswani | |
| 10,438,001 B1* | 10/2019 | Hariprasad | G06F 21/577 |
| 10,977,374 B1* | 4/2021 | Kuppa | G06F 21/577 |
| 2004/0221176 A1* | 11/2004 | Cole | G06F 21/577 |
| | | | 726/25 |
| 2008/0033989 A1 | 2/2008 | Oh | |
| 2012/0096558 A1* | 4/2012 | Evrard | H04L 63/1416 |
| | | | 726/25 |
| 2013/0227695 A1 | 8/2013 | Mohanakrishnan | |
| 2013/0232472 A1 | 9/2013 | Korner | |
| 2013/0290322 A1 | 10/2013 | Prosnitz | |
| 2015/0066575 A1 | 3/2015 | Baikalov | |
| 2015/0089385 A1 | 3/2015 | Radhakrishnan | |
| 2015/0248559 A1 | 9/2015 | Madou | |
| 2016/0021141 A1* | 1/2016 | Liu | H04L 63/1425 |
| | | | 726/23 |
| 2016/0112445 A1 | 4/2016 | Abramowitz | |
| 2016/0239665 A1* | 8/2016 | Hamby | G06F 21/577 |
| 2017/0213037 A1* | 7/2017 | Toledano | H04L 63/06 |
| 2017/0220805 A1 | 8/2017 | Ng | |
| 2017/0223043 A1 | 8/2017 | Munoz | |
| 2017/0244748 A1 | 8/2017 | Krause | |
| 2017/0255782 A1 | 9/2017 | Jayaraman | |
| 2017/0329466 A1 | 11/2017 | Krenkler | |
| 2018/0146004 A1 | 5/2018 | Belfiore, Jr. | |
| 2018/0260572 A1* | 9/2018 | Bhattacharya | G06F 21/577 |
| 2018/0288086 A1 | 10/2018 | Amiri | |
| 2019/0035027 A1* | 1/2019 | Ng | G06Q 40/08 |
| 2019/0095587 A1 | 3/2019 | Warner | |
| 2019/0109872 A1* | 4/2019 | Dhakshinamoorthy | H04L 43/06 |
| 2019/0114573 A1 | 4/2019 | Moore | |
| 2019/0289029 A1 | 9/2019 | Chawla | |
| 2019/0303583 A1* | 10/2019 | Hosking | G09B 5/00 |
| 2019/0327259 A1 | 10/2019 | DeFelice | |
| 2020/0057857 A1 | 2/2020 | Roytman | |
| 2020/0120126 A1 | 4/2020 | Ocepek | |
| 2020/0314137 A1* | 10/2020 | Tsitkin | H04L 63/1441 |
| 2020/0336507 A1 | 10/2020 | Lee | |
| 2022/0201042 A1* | 6/2022 | Crabtree | G06F 16/2477 |
| 2023/0048309 A1 | 2/2023 | Pasupuleti | |
| 2023/0099589 A1 | 3/2023 | Chenchal | |

* cited by examiner

300

Direct, to a software program under execution, a series of attack vectors
310

Diagnose a set of results associated with the software execution as comprising one of a security vulnerability and not a security vulnerability, the set of results produced based at least in part on the attack vectors
320

Assess a dynamic security vulnerability score for the software program based at least in part on the diagnosing
330

FIG. 3

METHOD AND SYSTEM FOR DYNAMIC TESTING WITH DIAGNOSTIC ASSESSMENT OF SOFTWARE SECURITY VULNERABILITY

RELATED APPLICATION

This application is a continuation of U.S. patent application Ser. No. 16/525,207 filed on Jul. 29, 2019, said priority application being incorporated by reference in its entirety.

TECHNICAL FIELD

The disclosure herein relates to software application security vulnerability diagnosis and assessment, including web-based enterprise software applications and websites.

BACKGROUND

Protection of safety-critical software platform infrastructures and systems employed in healthcare, telecommunications, banking, and other commercial and industrial uses remains a major challenge. In particular, cyberattacks can be unpredictable, and intended to compromise or inhibit secure operation of an infrastructure or a critical component within the infrastructure. Computer viruses, trojans, hackers, cryptographic key recovery attacks, malicious executables and bots may present a constant threat to users of computers connected to public computer networks such as the Internet and also private networks such as corporate computer networks. In response to these threats, enterprise organizations may deploy antivirus software and firewalls. However, such preventative attempts may not always prove adequate.

Multiple commercial industry mandates and government regulations necessitate the security of sensitive and confidential data, particularly in regard to personally identifiable information. Particular security policy management functions may need to be enforced, with attendant reporting.

For enterprise organizations deploying safety-critical software system infrastructure and components, it is important to ensure that their enterprise software applications and systems operate in a secure way and are robust and resilient with regard to cyberattacks performed via a data network. However, often the necessary software security assessment structure and solution may be missing or inadequate to assess current security aspects of a software system as deployed. Solutions are required to protect enterprise critical data from external threats by ensuring integrity of the software systems and applications used in conducting commerce.

BRIEF DESCRIPTION OF THE DRAWINGS

FIG. 3 illustrates a method of operation, in one example embodiment, of a server computing system for dynamic software security vulnerability assessment of web-based software applications.

DETAILED DESCRIPTION

Figure 1:
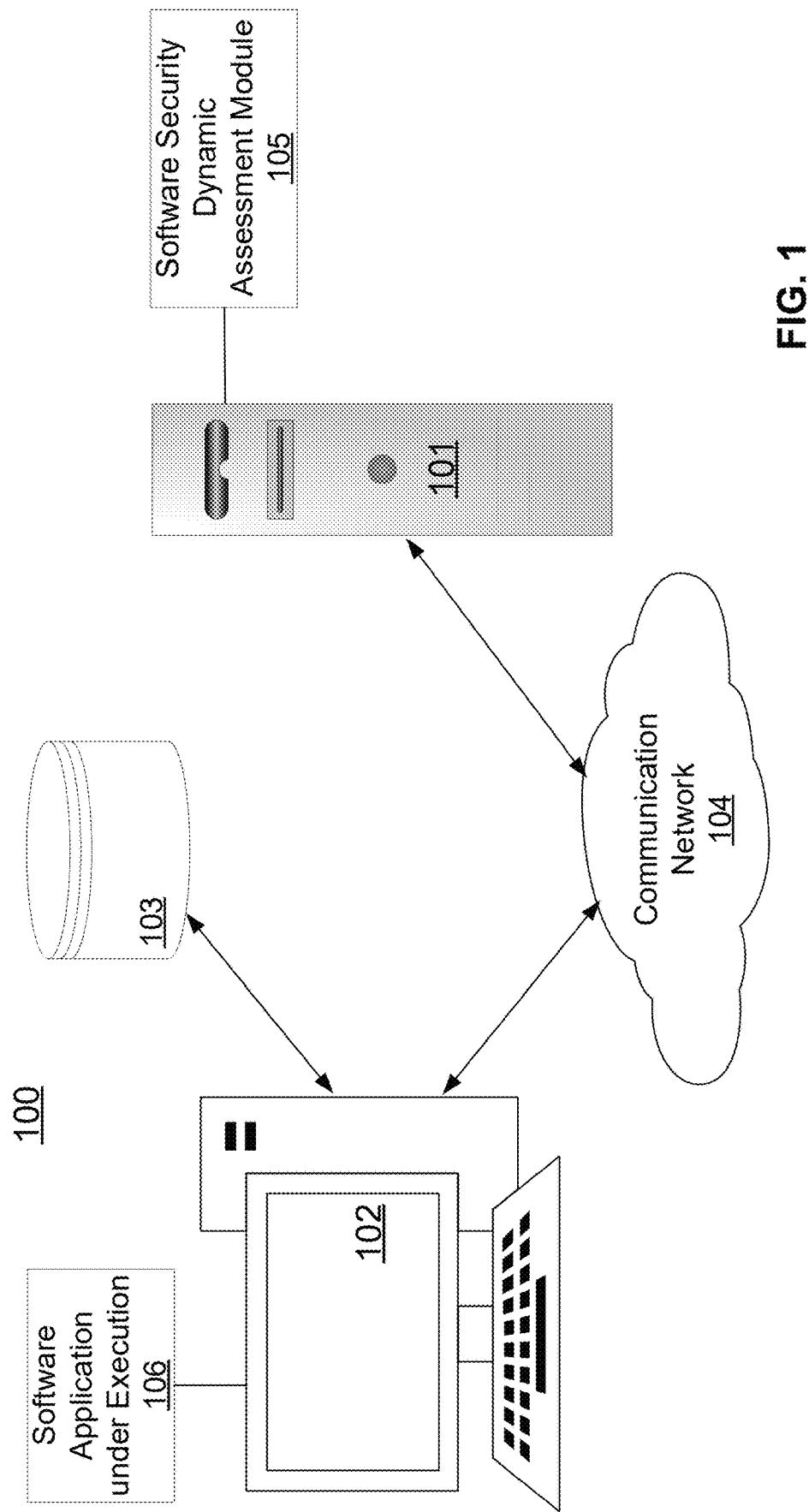
FIG. 1 illustrates, in an example embodiment, a cloud-based system for dynamic software security vulnerability assessment of web-based software applications.

Methods and systems provided herein advantageously enable a networked, cloud-based server device to dynamically access, diagnose and assess security attributes, including resilience and vulnerability attributes, of a software application that is under execution. Solutions herein provide dynamic application security testing by subjecting the software application, while under execution, to directed attack vectors from a scanning application, identifying vulnerabilities, and generating a dynamic security vulnerability score. As referred to herein, a software application includes web-based application programs as deployed, software as a service (SaaS), a cloud managed service provided application program.

In particular, methods and systems herein assess a dynamic security vulnerability during execution of software application or program in its running state. As used herein, the term "security vulnerability" means a programming error, feature or attribute that produces unintended behavior(s) and results in an application which may enable malicious code to bypass security features built into the application, whereupon, once the application's security features are bypassed, the malicious code can use the application as a gateway for appropriating or corrupting sensitive, protected, or confidential data.

The term "dynamic" as used herein refers to actions performed during real-time application program execution in one or more processors of a computing device for its intended purpose.

Dynamic security vulnerability or risk can be diagnosed and scored or ranked by utilizing various inputs, in some embodiments attack vectors as provided herein, to induce unexpected execution results in order to quantify a security risk associated with a particular aspect of a software product, such as a security risk associated with exploitation of a security vulnerability that is inherent to the software application. In this manner, dynamic assessment and security risk scoring associated with exploitation of a security vulnerability for a software application can contribute to more effectively identifying, prioritizing, managing and pre-empting security risks to an enterprise organization.

Furthermore, a dynamic security vulnerability score as proposed herein may be used to determine whether and to what extent to trust a web-based software application including software as a service (SaaS) applications, a website or similar infrastructure and software components. In other embodiments, the system can identify which of the various factors used in generating the security reliance score would have the most impact on the security vulnerability diagnostic score, thus assisting and directing administrators or others to evaluate and improve the impact of changes within an enterprise.

In accordance with a first example embodiment, a method of dynamic testing and diagnostic assessment of security vulnerability of cloud- or web-based enterprise software applications is provided. The method comprises directing, to a software program under execution, a series of attack vectors; diagnosing a set of results associated with the software execution as constituting one of a security vulnerability and not a security vulnerability, the set of results produced based at least in part on the attack vectors; and assessing a dynamic security vulnerability score for the software program based at least in part on the diagnosing.

In general, a higher dynamic security vulnerability score may be calculated or assessed in instances where a lower dynamic vulnerability score indicates lower security risk in terms of higher resilience to potential dynamic security threats. On the other hand, a lower score may be merited where the assessment indicates an increased security risk or a lessened resilience to potential software security threats.

In some embodiments, the dynamic security vulnerability score may be an aggregation of the set of results that constitute a security vulnerability that is attributable to the series of attack vectors.

In one variation, the dynamic security vulnerability score may be based on a weighted aggregation of the set of results constituting the security vulnerability that is attributable to the respective ones of the series of attack vectors. In this variation, reported vulnerabilities from different attack vectors would be weighted differently when assessing the score, since errors from certain attack vectors might be considered as having more serious potential and consequences for security violations than others.

In some practical uses of the methods and systems herein, results of the diagnostic assessment and scoring may be used to certify a web-based software application, or a provider of such application, under prevailing and pre-established proprietary, industry or governmental standards pertaining to software security vulnerability.

In accordance with a second example embodiment, a non-transitory medium storing instructions executable in a processor of a server computing device is provided. The instructions are executable to assess a dynamic security vulnerability score for a software application under execution by directing, to the software program under execution, a series of attack vectors; diagnosing a set of results associated with the software execution as constituting one of a security vulnerability and not a security vulnerability, the set of results produced based at least in part on the attack vectors; and assessing a dynamic security vulnerability score for the software program based at least in part on the diagnosing.

In accordance with a third example embodiment, a server computing system for dynamic testing and diagnostic assessment of security vulnerability of cloud- or web-based enterprise software applications is provided. The system comprises a server computing device that includes a memory storing instructions and one or more processors for executing the instructions stored thereon direct, to a software program under execution, a series of attack vectors; diagnose a set of results associated with the software execution as constituting one of a security vulnerability and not a security vulnerability, the set of results produced based at least in part on the attack vectors; and assess a dynamic security vulnerability score for the software program based at least in part on the diagnosing.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device.

Furthermore, one or more embodiments described herein may be implemented through the use of logic instructions that are executable by one or more processors of a computing device, including a server computing device. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory. A server computing device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, cloud-based system 100 for dynamic security diagnostic assessment of web-based enterprise software applications currently under execution. Server computing system or device 101 includes software security dynamic assessment module 105 embodied according to computer processor-executable instructions stored within a non-transitory memory. Server 101 is in communication via communication network 104 with computing device 102. Computing device 102, which may be a server computing device in some embodiments, may host enterprise software program or application 106 for execution thereon. Software program 106 in another embodiment may be a web-based application program. Database 103, for example storing enterprise data accessible to software application 106 under execution, is communicatively accessible to computing device 102.

Figure 2:
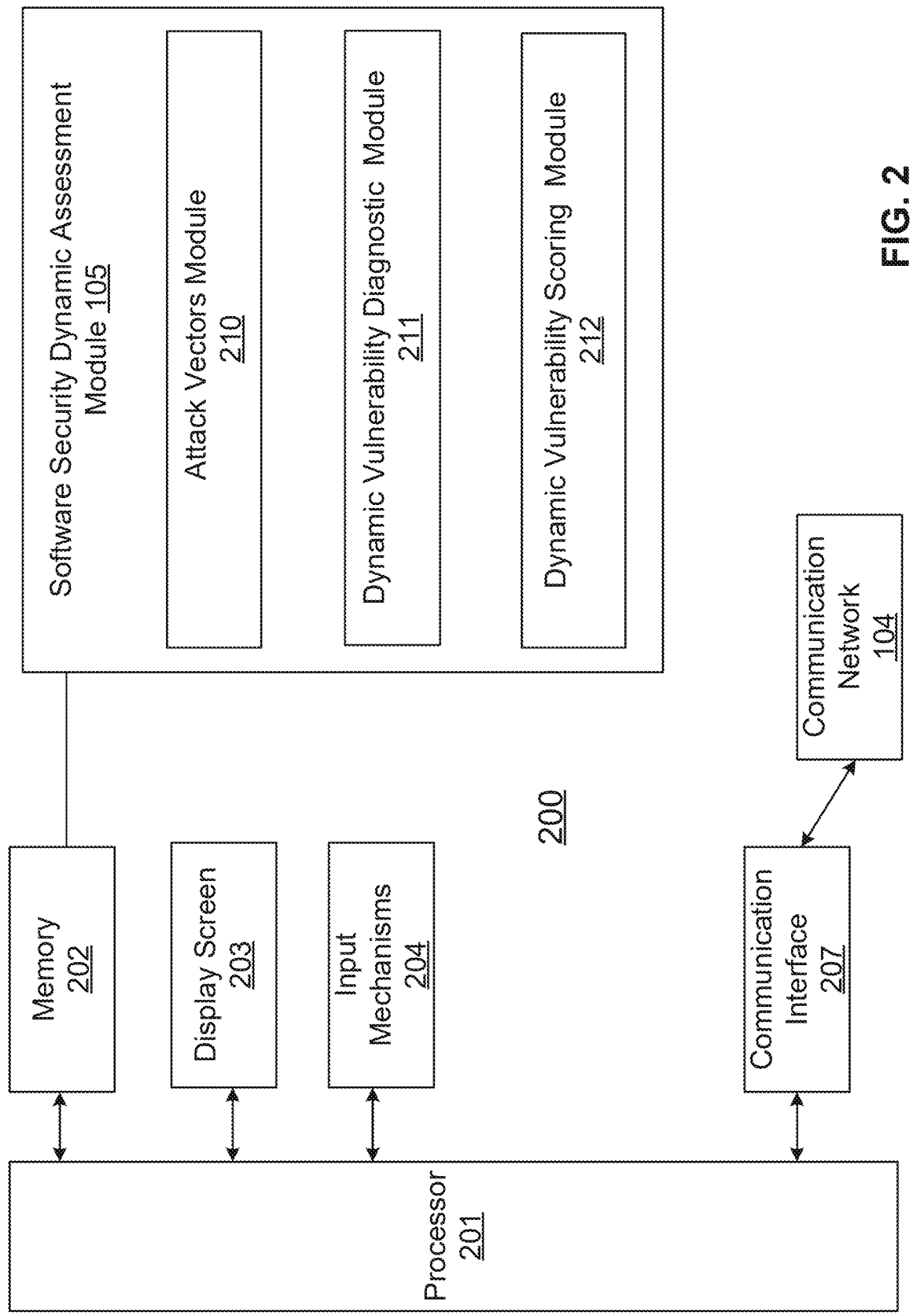
FIG. 2 illustrates, in one example embodiment, an architecture of a cloud-based server computing system for dynamic software security vulnerability assessment of web-based software applications.

FIG. 2 illustrates, in an example embodiment, architecture 200 of server computing system 101 hosting software security dynamic assessment module 105 for security diagnostic assessment of enterprise software applications. Server computing system or device 101, also referred to herein as server 101, may include processor 201, memory 202, display screen 203, input mechanisms 204 such as a keyboard or software-implemented touchscreen input functionality, and communication interface 207 for communicating via communication network 104. Memory 202 may comprise any type of non-transitory system memory, storing instructions that are executable in processor 201, including such as a static random access memory (SRAM), dynamic random access memory (DRAM), synchronous DRAM (SDRAM), read-only memory (ROM), or a combination thereof.

Software security dynamic assessment module 105 includes processor-executable instructions stored in memory 202 of server 101, the instructions being executable in processor 201. Software security dynamic assessment module 105 may comprise portions or sub-modules including attack vectors module 210, dynamic vulnerability diagnostic module 211 and dynamic vulnerability scoring module 212.

Processor 201 uses executable instructions of attack vectors module 210 to direct, to a software program under execution, a series of attack vectors.

In an embodiment, the software program comprises a cloud based software program that is communicative accessible to the security assessing server during the execution. The scanning application at server 101 directing the attack vectors may have no foreknowledge of the execution attributes of the software application under execution. For example, the scanning application may not have, nor does it need, access to source code of the application under execution, but is configured by way of the attack vectors to detect vulnerabilities by actually performing attacks. Identifying and targeting the application may be based partly on having acquired no prior knowledge of execution attributes and source code of the software application. The terms "application" and "program" are used interchangeably herein.

A series of attack descriptions, or an attack vectors as referred to herein, constituted of script code in some embodiments, can be accessed from a data store such as a database or from memory 202 of server device 101. The attack description may be constituted of a data set, constituted of script code in some embodiments, that encodes an attack or attempt to exploit or otherwise compromise a security vulnerability of the software program 106 under execution. For example, in embodiments, the attack description can include an identifier of a class or type of attack, a data value or group of data values that will be included within the attack data set, a reference to a particular attack data set, or a copy of an attack data set.

In an embodiment, one or more attack vectors of the series comprises a data set that encodes an attempt to exploit a security vulnerability aspect of the software application under execution.

In some variations, the data set may include one or more of an identifier of a class and a type of attack, a data value, a group of data values, a reference to a predetermined attack data set, and a copy of an attack data set.

Processor 201 uses executable instructions stored in dynamic vulnerability diagnostic module 211 to diagnose a set of results associated with the software execution as whether respective ones of the results constitute a dynamic security vulnerability or not, the set of results being produced based at least in part on the attack vectors as directed to the software program during execution.

In some aspects, the security vulnerability may relate to one or more of a cross-site scripting, a SQL injection, a path disclosure, a denial of service, a memory corruption, a code execution, a cross-site request forgery, a PHP injection, a Javascript injection and a buffer overflow.

In some embodiments, diagnosing a security vulnerability comprises the software application providing an error response indicating that at least one attack vector in the series of attack vectors successfully exploited a security vulnerability of the application.

In some cases, based on a result of the dynamic testing, a scanner in accordance with server 101 deploying the attack vectors may not report a dynamic security vulnerability for the application. In such cases, the application would have nullified the attack data set, thus pre-empting or preventing a security vulnerability, and accordingly provided an error response to indicate that a requested service or operation could not be executed because some input, for instance the attack data set, was improper. The dynamic security vulnerability diagnosis in this case would not report a security vulnerability for the application because the application did not use the attack data set in a manner that would allow exploitation of the targeted security vulnerability.

Processor 201 uses executable instructions stored in dynamic vulnerability scoring module 212 to assess a dynamic security vulnerability score for the software program based at least in part on the diagnosing.

In some embodiments, the dynamic security vulnerability score may be an aggregation of the set of results constituting a security vulnerability that is attributable to the series of attack vectors.

In one variation, the dynamic security vulnerability score may be based on a weighted aggregation of the set of results constituting the security vulnerability that is attributable to the respective ones of the series of attack vectors. In this variation, reported vulnerabilities from different attack vectors would be weighted differently when assessing the score, as some errors from different attack vectors might be considered as having more serious potential and consequences for security violations than others.

In embodiments, a higher security vulnerability diagnostic score may be determined or assigned in instances where the particular attribute contributes to, or indicates, a lower security risk or greater resilience to potential security threats. On the other hand, a lower score may be merited where assessment of a given attribute contributes to, or indicates, an increased security risk or a lessened resilience to potential software security threats.

It is contemplated that a security vulnerability score or similar security assessment may be applied to, and associated with a particular software provider, or even a SaaS enterprise user, in accordance with dynamic testing techniques as provided herein. In some aspects, security performance indicators may be assigned or determined for a given corps of programmers, or even for individual programmers, who deploy the web-based software, or contributed in definable ways to development of the software application. Such performance indicators may be assigned or derived at least in part based on the software security dynamic testing and assessment techniques disclosed herein. Software security performance indicators may be tracked and updated, for example using key performance indicator (KPI) measurements of dynamic security vulnerability instances.

In some aspects, the dynamic vulnerability scores may be correlated with performance criteria in accordance with pre-established proprietary, industry or governmental standards. Where such pre-established standards provide for certifications, such certifications may be applied or awarded to those software applications that merit, in accordance with the pre-established standards, requirements for software security vulnerability or resilience attributes based on the dynamic testing and scoring techniques disclosed herein. In such certification context, assigning a certification status to the software program may be based at least in part on the dynamic security vulnerability score in conjunction with the pre-established certification standard.

In embodiments, a higher dynamic security vulnerability diagnostic score may be determined or assigned in instances where the particular attribute contributes to, or indicates, a lower security risk or greater resilience to potential security threats. On the other hand, a lower score may be merited where assessment of a given attribute contributes to, or indicates, an increased security risk or a lessened resilience to potential software security threats.

In related embodiments, higher dynamic security vulnerability scores may be correlated with a higher potential for compromise of sensitive enterprise data by way of data corruption or unauthorized appropriation, a level of control ceded to an attacker, an amount of financial damage caused to an enterprise using, selling or distributing the software program, and a level of commercial integrity harm to an enterprise using, distributing or selling the software program. Based on such correlating, monetary premiums of a risk insurance policy may be assessed for an enterprise using, selling or distributing the web-based software program, commensurate with the potential harm to the enterprise, including monetary and commercial reputation or integrity harm considerations.

In certain aspects, dynamic security vulnerability scores as proposed herein may be used to determine whether and to what extent to trust an enterprise web-based software application, website or similar infrastructure and software components. In related embodiments, the techniques disclosed herein may be used to identify which of the various factors used in generating the dynamic security score would have the most critical software security impact, thus assisting and directing system administrators and others evaluate and improve the impact of changes.

Methodology

FIG. 3 illustrates, in an example embodiment, method 300 of operation of a server computing system 101 for dynamic security diagnostic assessment of web-based software applications, method 300 being performed by one or more processors 201 of server computing device 101. In describing the example of FIG. 3, reference is made to the examples of FIG. 1 and FIG. 2 for purposes of illustrating suitable components or elements for performing a step or sub-step being described.

Examples of method steps described herein relate to the use of server 101 for implementing the techniques described. According to one embodiment, the techniques are performed by software security dynamic assessment module 105 of server 101 in response to the processor 201 executing one or more sequences of software logic instructions that constitute software security dynamic assessment module 105. In embodiments, software security dynamic assessment module 105 may include the one or more sequences of instructions within sub-modules including attack vectors module 210, dynamic vulnerability diagnostic module 211 and dynamic vulnerability scoring module 212. Such instructions may be read into memory 202 from machine-readable medium, such as memory storage devices. In executing the sequences of instructions contained in attack vectors module 210, dynamic vulnerability diagnostic module 211 and dynamic vulnerability scoring module 212 of software security dynamic assessment module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

At step 310, processor 201 executes instructions of attack vectors module 210 to direct, from security assessing server 101, a series of attack vectors to software program under execution 106 at computing device 102.

In an embodiment, the software program comprises a cloud based software program that is communicative accessible to the security assessing server during the execution. The scanning application at server 101 directing the attack vectors may have no foreknowledge of the execution attributes of the software application under execution. For example, the scanning application may not have access to source code of the application under execution, but is configured by way of the attack vectors to detect vulnerabilities by actually performing attacks. Identifying and targeting the application may be based partly on having acquired no prior knowledge of execution attributes and source code of the software application.

In some embodiments, a series of attack descriptions, or an attack vectors as referred to herein, constituted of script code, can be accessed from a data store such as a database or from memory 202 of server device 101. the attack description may be constituted of as a data set that encodes an attack or attempt to exploit a security vulnerability of the software program 106 under execution. For example, in embodiments, the attack description can include an identifier of a class or type of attack, a data value or group of data values that will be included within the attack data set, a reference to a particular attack data set, or a copy of an attack data set.

In an embodiment, one or more attack vectors of the series may include a data set that encodes an attempt to exploit a security vulnerability aspect of the software application under execution.

In some variations, the data set may include one or more of an identifier of a class and a type of attack, a data value, a group of data values, a reference to a predetermined attack data set, and a copy of an attack data set.

At step 320, processor 201 of server computing device 101 executes instructions included in dynamic vulnerability diagnostic module 211 to diagnose a set of results associated with the software execution as to whether respective ones of the results constitute a security vulnerability or not, the set of results being produced based at least in part on the attack vectors.

In some aspects, the security vulnerability may relate to one or more of a cross-site scripting, a SQL injection, a path disclosure, a denial of service, a memory corruption, a code execution, a cross-site request forgery, a PHP injection, a Javascript injection and a buffer overflow.

In some embodiments, diagnosing a security vulnerability comprises the software application providing an error response indicating that at least one attack vector in the series of attack vectors successfully exploited a security vulnerability of the application.

In some cases, based on a result of the dynamic testing, a scanner in accordance with server 101 deploying the attack vectors may not report a dynamic security vulnerability for the application. In such cases, the application would have nullified the attack data set, thus pre-empting or preventing a security vulnerability, and accordingly provided an error response to indicate that a requested service or operation could not be executed because some input, for instance the attack data set, was improper. The dynamic security vulnerability diagnosis in this case would not report a security vulnerability for the application because the application did not use the attack data set in a manner that would allow exploitation of the targeted security vulnerability.

At step 330, processor 201 executes instructions included in dynamic vulnerability scoring module 212, to assess a dynamic security vulnerability score for the software program based at least in part on the diagnosing In some embodiments, the dynamic security vulnerability score may be an aggregation of the set of results constituting a security vulnerability that is attributable to the series of attack vectors.

In one variation, the dynamic security vulnerability score may be based on a weighted aggregation of the set of results constituting the security vulnerability that is attributable to the respective ones of the series of attack vectors. In this variation, reported vulnerabilities from different attack vectors would be weighted differently when assessing the score, as some errors from different attack vectors might be considered as having more serious potential and consequences for security violations than others.

In embodiments, a higher security vulnerability diagnostic score may be determined or assigned in instances where the particular attribute contributes to, or indicates, a lower security risk or greater resilience to potential security threats. On the other hand, a lower score may be merited where assessment of a given attribute contributes to, or indicates, an increased security risk or a lessened resilience to potential software security threats.

It is contemplated that a security vulnerability score or similar security assessment may be applied to, and associated with a particular software provider, or even a SaaS enterprise user, in accordance with dynamic testing techniques as provided herein. In some aspects, security performance indicators may be assigned or determined for a given corps of programmers, or even for individual programmers, who deploy the web-based software, or contributed in definable ways to development of the software application. Such performance indicators may be assigned or derived at least in part based on the software security dynamic testing and assessment techniques disclosed herein. Software security performance indicators may be tracked and updated, for example using key performance indicator (KPI) measurements of dynamic security vulnerability instances.

In some embodiments, the dynamic vulnerability scores may be correlated with performance criteria in accordance with pre-established proprietary, industry or governmental standards. Where such pre-established standards provide for certifications, such certifications may be applied or awarded to those software applications that merit, in accordance with the pre-established standards, requirements for software security vulnerability or resilience attributes based on the dynamic testing and scoring techniques disclosed herein. In such certification context, assigning a certification status to the software program may be based at least in part on the dynamic security vulnerability score in conjunction with the pre-established certification standard.

In related embodiments, higher dynamic security vulnerability scores may be correlated with a higher potential for compromise of sensitive enterprise data by way of data corruption or unauthorized appropriation, a level of control ceded to an attacker, an amount of financial damage caused to an enterprise using, selling or distributing the software program, and a level of commercial integrity harm to an enterprise using, distributing or selling the software program. Based on such correlating, monetary premiums of a risk insurance policy may be assessed for an enterprise using, selling or distributing the web-based software program, commensurate with the potential harm to the enterprise, including monetary and commercial reputation or integrity harm considerations.

It is contemplated that embodiments described herein extend to individual elements and concepts described herein, as well as for embodiments to include combinations of elements recited anywhere in this application. Although embodiments are described in detail herein with reference to the accompanying drawings, it is to be understood that the invention is not limited to only such example embodiments. As such, many modifications and variations will be apparent to practitioners skilled in the art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventors from claiming rights to such combinations.

What is claimed is:

1. A method of applying a security vulnerability assessment of a software program, the method comprising:
   directing, from a security assessing server, to a software program under execution, a plurality of attack vectors;
   diagnosing a set of results associated with the software program under execution as comprising a security vulnerability, the set of results produced based at least in part on the plurality of attack vectors;
   identifying, in accordance with the diagnosing, a set of factors having a highest impact on a dynamic security vulnerability score for the software program under execution; and
   assessing, in accordance with the identifying, a monetary premium of a risk insurance policy merited by an enterprise based at least in part on a level of control ceded to an attacker in accordance with the dynamic security vulnerability score.

2. The method of claim 1 wherein the software program comprises an enterprise software program that is communicatively accessible to the security assessing server during the execution, the security assessing server having acquired no prior knowledge of execution attributes of the software program prior to the execution.

3. The method of claim 1 further comprising determining a dynamic security vulnerability score for the software program under execution based at least in part on the diagnosing.

4. The method of claim 3 further comprising awarding a certification status to the software program under execution based at least in part on the dynamic security vulnerability score in accordance with a pre-established certification standard.

5. The method of claim 4 wherein the pre-established certification standard includes at least one of an industry mandated, a proprietary and a government mandated certification standards.

6. The method of claim 3 wherein the dynamic security vulnerability score comprises an aggregation of the set of results constituting the security vulnerability that is attributable to the plurality of attack vectors.

7. The method of claim 6 wherein the dynamic security vulnerability score comprises a weighted aggregation of the set of results constituting the security vulnerability that is attributable to the respective ones of the plurality of attack vectors.

8. The method of claim 1 wherein at least one attack vector of the plurality comprises a data set that encodes an attempt to exploit a security vulnerability aspect of the software program under execution.

9. The method of claim 8 wherein the data set includes at least one of an identifier of a class and a type of attack, a data value, a group of data values, a reference to a predetermined attack data set, and a copy of an attack data set.

10. The method of claim 1 wherein the diagnosing of the security vulnerability comprises the software program providing an error response indicating that at least one attack vector in the plurality of attack vectors successfully exploited a security vulnerability of the software program under execution.

11. A server computing system comprising:
    a processor;
    a non-transitory memory storing instructions, the instructions when executed causing the processor to implement operations comprising:
       directing, from a security assessing server, to a software program under execution, a plurality of attack vectors;
       diagnosing a set of results associated with the software program under execution as comprising a security vulnerability, the set of results produced based at least in part on the plurality of attack vectors;
       identifying, in accordance with the diagnosing, a set of factors having a highest impact on a dynamic security vulnerability score for the software program under execution; and
       assessing, in accordance with the identifying, a monetary premium of a risk insurance policy merited by an enterprise based at least in part on a level of control ceded to an attacker in accordance with the dynamic security vulnerability score.

12. The server computing system of claim 11 wherein the software program comprises an enterprise software program that is communicatively accessible to the security assessing server during the execution, the security assessing server having acquired no prior knowledge of execution attributes of the software program prior to the execution.

13. The server computing system of claim 11 further comprising instructions causing the processor to implement operations including determining a dynamic security vulnerability score for the software program under execution based at least in part on the diagnosing.

14. The server computing system of claim 13 further comprising instructions causing the processor to implement operations including awarding a certification status to the software program under execution based at least in part on the dynamic security vulnerability score in accordance with a pre-established certification standard.

15. The server computing system of claim 14 wherein the pre-established certification standard includes at least one of an industry mandated, a proprietary and a government mandated certification standards.

16. The server computing system of claim 13 wherein the dynamic security vulnerability score comprises an aggregation of the set of results constituting the security vulnerability that is attributable to the plurality of attack vectors.

17. The server computing system of claim 16 wherein the dynamic security vulnerability score comprises a weighted aggregation of the set of results constituting the security vulnerability that is attributable to the respective ones of the plurality of attack vectors.

18. The server computing system of claim 11 wherein at least one attack vector of the plurality comprises a data set that encodes an attempt to exploit a security vulnerability aspect of the software program under execution.

19. The server computing system of claim 18 wherein the data set includes at least one of an identifier of a class and a type of attack, a data value, a group of data values, a reference to a predetermined attack data set, and a copy of an attack data set.

20. The server computing system of claim 11 wherein the diagnosing of the security vulnerability comprises the software program providing an error response indicating that at least one attack vector in the plurality of attack vectors successfully exploited a security vulnerability of the software program under execution.

\* \* \* \* \*